United States Patent [19]

DiEdwardo et al.

[11] 4,424,307

[45] Jan. 3, 1984

[54] OXYMETHYLENE POLYMER MODIFIED WITH 1,2-POLYBUTADIENE EXHIBITING ENHANCED TENSILE IMPACT PROPERTIES

[75] Inventors: Andrew H. DiEdwardo, Parsippany; Rajal M. Kusumgar, Livingston, both of N.J.

[73] Assignee: Celanese Corporation, New York, N.Y.

[21] Appl. No.: 362,360

[22] Filed: Mar. 26, 1982

[51] Int. Cl.³ .......................... C08F 8/28; C08L 61/00
[52] U.S. Cl. .................................................... 525/154
[58] Field of Search ........................................ 525/154

[56] References Cited

U.S. PATENT DOCUMENTS 3,704,275 11/1972 Burg et al. ........................ 525/154

*Primary Examiner*—J. Ziegler
*Attorney, Agent, or Firm*—Maria C. H. Lin

[57] ABSTRACT

An oxymethylene polymer which is modified with 1,2-polybutadiene is provided which exhibits enhanced physical properties, including tensile impact, elongation, and work to break. The oxymethylene polymer may be a homopolymer, consisting essentially of recurring oxymethylene groups, or a copolymer (as described).

13 Claims, No Drawings

OXYMETHYLENE POLYMER MODIFIED WITH 1,2-POLYBUTADIENE EXHIBITING ENHANCED TENSILE IMPACT PROPERTIES

BACKGROUND OF THE INVENTION

Oxyalkylene polymers, specifically oxymethylene polymers having recurring —CH$_2$O— units, have been known for many years. They may be prepared by the polymerization of anhydrous formaldehyde or by the polymerization of trioxane, which is a cyclic trimer of formaldehyde.

High-molecular weight oxymethylene polymers have been prepared by polymerizing trioxane in the presence of certain fluoride catalysts. They may also be prepared in high yields and at rapid reaction rates by the use of catalysts, comprising boron fluoride coordination complexes with organic compounds, as described in U.S. Pat. No. 2,989,506 to Donald E. Hudgin and Frank M. Berardinelli.

Other methods of preparing oxymethylene polymers are disclosed by Kern et al in Angewandte Chemie, 73(6), 177–186 (Mar. 21, 1961) and in Sittig, "Polyacetals: What You Should Know," Petroleum Refiner, 41, 11, 131–170 (November 1962), including polymers containing repeating carbon-to-carbon single bonds in the polymer chain and which are made by copolymerizing trioxane with cyclic ethers, e.g., dioxane, lactones, e.g., betapropiolactone, anhydrides, e.g., cyclic adipic anhydride, and ethylenically unsaturated compounds, e.g., styrene, vinyl acetate, vinyl methyl ketone, acrolein, etc.

Also contemplated are oxymethylene polymers the end groups of which are reacted or "capped" with, for example, ester or ether end groups. Typical capping agents are alkanoic anhydrides (e.g., acetic anhydride), which form ester end groups, and dialkyl ethers (e.g., dimethyl ether), which form ether end groups.

Still other oxymethylene polymers, more particularly copolymers, which are adapted for use in producing the modified oxymethylene polymers for use in this invention are those which are prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Oxymethylene polymers are distinguished by a number of excellent properties so that they are suitable for use as engineering resins in a variety of industrial applications. Many of these desirable properties result from the fact that these oxymethylene polymers are crystalline.

Depending upon reaction conditions, butadiene polymerizes in either of two forms: 1,4-polybutadiene, a straight-chain polymer, or 1,2-polybutadiene, which consists of recurring units of the following:

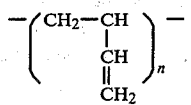

High yields of 1,2-polybutadiene can be obtained by solution polymerization of butadiene in the presence of a triethylaluminum/vanadium triacetylacetonate catalyst system.

U.S. Pat. No. 3,704,275 to Burg et al discloses blending polyoxymethylenes of the type discussed above with the polymerization products of 1,3-dienes, such as 1,4-polybutadiene. (See also U.S. Pat. No. 3,980,734 to Burg et al). However, it has been found that 1,4-polybutadiene actually causes deterioration in tensile strength, elongation, flex strength, Gardner Impact Resistance and other parameters, as will become apparent in the Comparative Examples which follow.

U.S. Pat. No. 3,476,832 to Pritchard discloses incorporation of copolymers having butadiene units into polyoxymethylenes to improve impact resistance and flex strength. See also Walling et al U.S. Pat. No. 3,027,352.

U.S. Pat. No. 3,975,459 to Schmidt et al discloses blending of polyoxymethylene with a block copolymer of a diene polymer block such as polybutadiene and at least one poly(alkylmethacrylate) block for increasing impact resistance.

U.S. Pat. No. 3,749,755 to Bronstert et al discloses improved impact resistance polyoxymethylene blended with a graft copolymer which may contain up to 25% by weight 1,4-butadiene units.

U.S. Pat. No. 3,796,677 to Laber et al discloses broadly the incorporation of rubbers such as polybutadiene into polyformaldehyde.

The Japan Synthetic Rubber Co., Ltd. No. 1, 1-chome Kyobashi, Chuo-Ku, Tokyo, Japan markets a high molecular weight ($\geq 100,000$) low crystalline (15-25%) polybutadiene consisting of at least 90% 1,2-butadiene units suitable for this invention. This product is sold under the designation JSR RB and is sold for use as a thermoplastic resin as well as a modifier for various rubbers. When blended with, for example, styrene-butadiene rubber, or cis-1,4-polybutadiene rubber, the flowability, extrudability, hardness and modulus of the resultant composition is improved.

It is an object of the present invention to provide a modified polyoxymethylene molding composition which is capable of being molded to form articles having highly satisfactory tensile impact properties.

It is a further object of the present invention to provide a modifying substance which can be dispersed well in the polyoxymethylene matrix.

These and other objects as well as the scope, nature, and utilization of the claimed invention will be apparent to those skilled in the art from the following detailed description and appended claims.

SUMMARY OF THE INVENTION

It has been found that a modified polyoxymethylene molding composition which is capable of being molded to form articles exhibiting enhanced tensile impact properties comprises an intimate blend of
  (a) an oxymethylene polymer; and
  (b) from about 1 to about 20% by weight based on the total weight of the composition 1,2-polybutadiene.

DESCRIPTION OF PREFERRED EMBODIMENTS

The Oxymethylene Polymer

The oxymethylene polymer to be used in accordance with this invention may be of two types: (a) an oxymethylene homopolymer or (b) an oxymethylene copolymer.

The oxymethylene homopolymer which is modified in accordance with the present invention consists virtually essentially of recurring —OCH$_2$— units.

In the most preferred embodiment, the oxymethylene copolymer which is modified in accordance with the present invention is one which is known in the art and possesses a relatively high level of polymer crystallinity, i.e., approximately 70 to 80 percent. Such oxymethylene copolymer has repeating units which consist essentially of (a) —OCH$_2$— groups interspersed with (b) groups represented by the general formula:

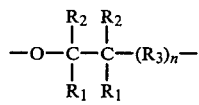

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive. The —OCH$_2$— units of (a) constitute from 85% to 99.9% of the recurring units. The units of (b) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst such as a Lewis acid (e.g., BF$_3$, PF$_5$, etc.) or other acids (e.g., HClO$_4$, 1% H$_2$SO$_4$, etc.).

In general, the cyclic ethers employed in making the oxymethylene copolymer are those represented by the general formula $$\begin{array}{c} R_1CR_2\text{———}O \\ | \qquad\qquad | \\ R_1CR_2\text{——}(CR_3)_n \end{array}$$

wherein each R$_1$ and R$_2$ is selected from the group consisting of hydrogen, lower alkyl and halogen-substituted lower alkyl radicals, and each R$_3$ is selected from the group consisting of methylene, oxymethylene, lower alkyl and haloalkyl-substituted methylene and lower alkyl and haloalkyl-substituted oxymethylene radicals, and n is an integer from zero to three inclusive. Each lower alkyl radical preferably has from one to two carbon atoms inclusive.

The preferred cyclic ethers used in the preparation of the oxymethylene copolymers are ethylene oxide and 1,3-dioxolane, which may be represented by the formula:

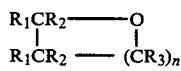

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the oxymethylene copolymer is the aforementioned boron trifluoride as discussed in the previously identified Walling et al patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are modified to form the compositions of this invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene copolymer component of the composition of this invention preferably is an oxymethylene copolymer that has been previously stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in U.S. Pat. No. 3,219,623, to Frank M. Berardinelli which is assigned to the same assignee as the present invention, and by this cross-reference is made a part of the disclosure of the instant application.

If desired the oxymethylene copolymer may be end-capped by techniques known to those skilled in the art. A preferred end-capping technique is accomplished by acetylation with acetic anhydride in the presence of sodium acetate catalyst.

The oxymethylene copolymer preferably incorporates the standard additives present in oxymethylene copolymer molding resins. For instance, a minor concentration of one or more anti-oxidants, chain scission inhibitors, acid scavengers, lubricants, nucleating agents, pigments, fibers, etc. may also be present. A preferred oxymethylene copolymer is commercially available from Celanese Plastics and Specialties Company under the designation CELCON ® acetal copolymer.

The 1,2-Polybutadiene

The 1,2-polybutadiene to be used in accordance with this invention is a high- (greater than 100,000 number average) molecular weight, low-crystalline polymer comprising at least 90% 1,2-units (as determined by Morero method infrared ray spectrum). In the preferred embodiment, the 1,2-polybutadiene is syndiotactic, which refers to a stereochemical configuration wherein the pendant vinyl groups which depend from alternating carbon atoms in the main chain are alternately "up" and "down" with respect to the plane of the main carbon chain, as depicted below:

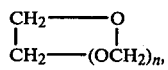

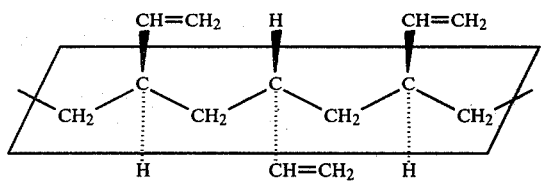

Syndiotactic 1,2-polybutadiene is prepared by solution polymerization of butadiene monomer employing a triethylaluminum/vanadium triacetylacetonate catalyst system. Alternately, a catalyst system comprising a cyanobenzene-chromium complex ($Cr(C_6H_5CN)_6$) and triethylaluminum in a ratio of 1:2 may be used. Both systems provide at least about 90% stereospecificity with respect to the syndiotactic configuration. (Stevens, *Polymer Chemistry-an Introduction*, 1975, p. 172)

It is desirable that the 1,2-polybutadiene have a low crystallinity (preferably 10–30%) and low melting point (less than about 90° C.) so that it may be processed by ordinary plastic processing methods and machinery.

High-molecular weight, low-crystalline, low-melting 1,2-polybutadiene sold as JSR RB can be obtained from the Japan Synthetic Rubber Co., Ltd., No. 1,1-chome, Kyobashi, Chuo-ku, Tokyo, Japan. JSR RB810 has a crystallinity of approximately 15%, a melting point of 75° C., a number average molcular weight of greater than 100,000, and comprises about 90% 1,2-units. JSR RB820 is approximately 25 percent crystalline, melts at 80° C., has a number average molecular weight of greater than 100,000, and comprises about 92% 1,2-units.

This polymer is comparatively reactive with respect to 1,4-polybutadiene or other polymers because of its structure; that is, it has a vinyl group and a hydrogen bonded to a tertiary carbon at the allyl position in each structural unit. Thus, 1,2-polybutadiene possesses unique blending characteristics which make it suitable for this invention.

Formation of the 1,2-Polybutadiene-Modified Oxymethylene Polymer

The 1,2-polybutadiene (heretofore described) is intimately blended with the oxymethylene copolymer or homopolymer (heretofore described) by any conventional technique known to those skilled in the art which is capable of producing a substantially uniform dispersion of the 1,2-polybutadiene throughout the polymer matrix thereby forming the improved molding composition of the present invention. In a preferred technique, the compounding is accomplished by the use of a compounding equipment with the oxymethylene polymer being provided at a temperature of approximately 190° C. Other representative apparatus in which the intimate blending may be accomplished include any single or twin screw extruder (e.g., a Brabender mixer). It has been found that improved blending is accomplished through the use of high shear mixing equipment which translates into the exhibition of improved physical properties in molded articles formed from the resulting composition.

The 1,2-polybutadiene modified polyoxymethylene composition of the present invention can be utilized to form molded articles in accordance with standard molding procedures commonly utilized with the oxymethylene polymer. For instance, the composition while at a temperature of approximately 385° to 390° F. can be molded to form a three-dimensional article using standard equipment and molding conditions.

It surprisingly has been found that molded articles formed from the oxymethylene molding composition of the present invention exhibit enhanced tensile impact properties when compared to other modified oxymethylene molding compositions. As will be made apparent in the following examples, the tensile strength, elongation, and work to break values are enhanced with respect to the unmodified polymer. Additionally, such advantages can be achieved on an economical basis.

The theory whereby the 1,2-polybutadiene modified polyoxymethylene molding composition of the present invention is capable of being molded to form articles exhibiting enhanced impact resistance when compared to unmodified oxymethylene polymers is considered to be highly complex and incapable of simple explanation. Accordingly, the property balance exhibited is considered to be unexpected.

The following Examples are presented as specific illustrations of the invention. It should be understood, however, that the invention is not limited to the specific details of the Examples.

EXAMPLES 1–4

The oxymethylene polymer commercially available from Celanese Corp. under the designation CELCON M90-04 was a trioxane-ethylene oxide copolymer containing approximately 98 percent by weight of recurring —$OCH_2$— groups and approximately 2 percent by weight of comonomer units derived from ethylene oxide having the formula —$OCH_2CH_2$—. The oxymethylene copolymer was prepared as previously has been described herein and more specifically in the aforementioned U.S. Pat. No. 3,027,352 to Walling et al, and had been hydrolyzed to stabilize the ends of the polymer chains. The oxymethylene copolymer possessed a crystallinity of approximately 75 percent, a number average molecular weight of approximately 35,000, an inherent viscosity (I.V.) of approximately 1.3 (measured at 60° C. in a 0.1 weight percent solution in p-chlorophenol containing 2 weight percent of alphapinene), a melting temperature of 165° C., and a melt index of approximately 9.0 g/10 min. Included in the oxymethylene copolymer were small amounts of thermal stabilizer, antioxidants, internal lubricant and nucleating agent.

The 1,2-polybutadiene was obtained from the Japan Synthetic Rubber Co., Ltd., Tokyo, Japan under the designation JSR RB 810 and possessed more than 90% 1,2-units, and had an average molecular weight of more than 100,000 and a crystallinity of 15 to 25%.

The 1,2-polybutadiene was intimately blended with samples of the oxymethylene copolymer (heretofore described) in various concentrations by use of a ZSK twin screw extruder. Molding pellets of the 1,2-polybutadiene modified oxymethylene copolymer were produced wherein the 1,2-polybutadiene was present in concentrations of 1.5% by weight (Example 1), 3% by weight (Example 2), 5 percent by weight (Example 3), and 10% by weight (Example 4).

TABLE I

OXYMETHYLENE COPOLYMER - 1,2-POLYBUTADIENE BLENDS

| PROPERTIES | OXYMETHYLENE COPOLYMER | EXAMPLE 1 OXYMETHYLENE COPOLYMER + 1.5% 1,2-PB | EXAMPLE 2 OXYMETHYLENE COPOLYMER + 3% 1,2-PB | EXAMPLE 3 OXYMETHYLENE COPOLYMER + 5% 1,2-PB | EXAMPLE 4 OXYMETHYLENE COPOLYMER + 10% 1,2-PB |
|---|---|---|---|---|---|
| TENSILE STRENGTH PSI, Y/B | 8,910/ 6,630 | 8,200/ 6,270 | 7,720/ 6,640 | 7,870/ 6,300 | 7,130/ 6,280 |
| ELONGATION, % | 70–80 | 80 | 165 | 183 | 284 |
| WORK TO BREAK IN. LBS. | 26–30 | 40 | 52 | 56 | 84 |
| FLEX STRENGTH PSI | 11,600/ 12,000 | 10,800 | 10,300 | 10,500 | 9,480 |
| FLEX MOD $\times 10^5$ PSI | 3.57 | 3.23 | 3.18 | 3.16 | 2.85 |
| TENSILE IMPACT FT-LBS/SQ. IN. | 110 | 115 | 165 | 132 | 144 |
| GARDNER IMPACT IN. LBS. | 35 | 35–40 | 60 | 30 | 25 |

The above-noted blends were next molded to form standard bars by a standard injection molding machine (i.e., an Arburg molding machine). During molding a temperature profile was employed whereby the temperature ranged from the rear to the nozzle of 380° F. to 400° F., and the mold temperature ranged from approximately 180° to 200° F. The injection pressure was 9,000 psi, the hold pressure was 875 psi and the back pressure was 0 psi. The resulting molded test bars were next tested for physical properties and the results are reported in TABLE I. The tensile strength and elongation values were determined in accordance with ASTM D-638, the work to break in accordance with ASTM D-638, the flexural strength and flexural modulus values in accordance with ASTM D-790, the tensile impact strength in accordance with ASTM D-1822, and the final impact value in accordance with the standard Gardner test.

It will be noted that blends of 1,2-polybutadiene with the oxymethylene copolymer display improved physical properties as compared to the oxymethylene copolymer alone. These properties include increased elongation, work to break, tensile impact strength, and Gardner impact resistance values. Elongation and work to break values are increased proportionally with added 1,2-polybutadiene. Tensile impact strength and Gardner impact resistance tend to reach a maximum at about 3 percent by weight based on the total weight of the composition 1,2-polybutadiene level.

EXAMPLES 5–8

The oxymethylene polymer is a homopolymer consisting of recurring —OCH$_2$— groups. The oxymethylene homopolymer includes minor quantities of alpha-pinene as stabilizer, as well as small amounts of thermal stabilizer, antioxidants, internal lubricant, and nucleating agent.

Intimate blends of the oxymethylene homopolymer and 1,2-polybutadiene are formed and then molded as heretofore described with respect to Examples 1 to 4. Molding pellets of the 1,2-polybutadiene modified polyoxymethylene are produced wherein the 1,2-polybutadiene is present in concentrations of 1.5% by weight (Example A), 3% by weight (Example B), 5% by weight (Example C), and 10% by weight (Example D). Superior tensile strength is observed.

COMPARATIVE EXAMPLES

Control samples of the oxymethylene copolymer were molded and tested in the manner described above. The copolymer was blended with various concentrations of 1,4-polybutadiene and subjected to the heretofore described tests, and the results reported in TABLE II. Similarly, the homopolymer is blended with 1,4-polybutadiene and molded.

TABLE II

OXYMETHYLENE COPOLYMER - 1,4-POLYBUTADIENE BLENDS

| PROPERTIES | OXYMETHYLENE COPOLYMER | COMPARATIVE EXAMPLE A OXYMETHYLENE COPOLYMER + 1.5% 1,4-PB | COMPARATIVE EXAMPLE B OXYMETHYLENE COPOLYMER + +3% 1,4-PB | COMPARATIVE EXAMPLE C OXYMETHYLENE COPOLYMER + 5% 1,4-PB | COMPARATIVE EXAMPLE D OXYMETHYLENE COPOLYMER 10% 1,4-PB |
|---|---|---|---|---|---|
| TENSILE STRENGTH PSI, Y/B | 8,700/ 6,620 | 8,030/ 6,570 | 7,610/ 6,570 | 7,210/ 6,480 | 6,310/ 6,050 |
| ELONGATION, % | 70–80 | 68 | 60 | 57 | 40 |
| WORK TO BREAK IN. LBS. | 26 | 23 | 21 | 19 | 12 |
| FLEX STRENGTH PSI | 11,600 | 10,700 | 10,200 | 9,570 | 8,270 |
| FLEX MOD $\times 10^5$ | 3.57 | 3.30 | 3.19 | 2.98 | 2.66 |
| TENSILE IMPACT FT-LBS/SQ. IN. | 110 | 88 | 64 | 46 | 27 |
| GARDNER IMPACT | 35 | 20 | 12 | 8 | 6 |

TABLE II-continued

| | | OXYMETHYLENE COPOLYMER - 1,4-POLYBUTADIENE BLENDS | | | |
| PROPERTIES | OXYMETHYLENE COPOLYMER | COMPARATIVE EXAMPLE A OXYMETHYLENE COPOLYMER + 1.5% 1,4-PB | COMPARATIVE EXAMPLE B OXYMETHYLENE COPOLYMER + +3% 1,4-PB | COMPARATIVE EXAMPLE C OXYMETHYLENE COPOLYMER + 5% 1,4-PB | COMPARATIVE EXAMPLE D OXYMETHYLENE COPOLYMER 10% 1,4-PB |
|---|---|---|---|---|---|
| IN. LBS. | | | | | |

The oxymethylene polymer is blended with 25% 1,2-polybutadiene as described above. The resultant composition is very rubber-like, and exhibits a drop in heat distortion temperature.

As previously noted, blends of 1,2-polybutadiene with the oxymethylene polymers provide improved tensile strength and Gardner impact resistance, and increased elongation and work to break values compared to either the homopolymer or copolymer alone. In contrast, the polyoxymethylene-1,4-polybutadiene blends in all proportions tested display deterioration of each of the following properties: tensile strength, elongation, work to break, flex strength, flex modulus, tensile impact strength, and Gardner impact resistance.

Although the invention has been described with preferred embodiments, it is to be understood that variations and modifications may be resorted to, which will be apparent to those skilled in the art. Such variations and modifications are to be considered within the scope and purview of the claims appended hereto.

We claim:

1. A modified polyoxymethylene molding composition which is capable of being molded to form articles exhibiting enhanced tensile impact properties comprising an intimate blend of
   (a) from about 99 to about 80% by weight, based on the total weight of the composition of an oxymethylene polymer; and
   (b) from about 1 to about 20% by weight, based on the total weight of the composition, of a high molecular weight, low crystalline 1,2-polybutadiene comprising at least 90% 1,2-units.

2. The modified polyoxymethylene molding composition of claim 1, wherein said oxymethylene polymer is a homopolymer consisting essentially of recurring —OCH$_2$— groups.

3. The modified polyoxymethylene molding composition of claim 1, wherein said 1,2-polybutadiene comprises from about 2% to about 4% by weight according to the total weight of the composition.

4. The modified polyoxymethylene molding composition of claim 1, wherein said 1,2-polybutadiene comprises approximately 3% by weight according to the total weight of the composition.

5. The modified polyoxymethylene molding composition of claim 1, wherein said 1,2-polybutadiene polymer has a number average molecular weight of at least 100,000.

6. The modified polyoxymethylene molding composition of claim 1, wherein said 1,2-polybutadiene polymer has a crystallinity of approximately 10 to 30 percent.

7. A modified polyoxymethylene molding composition which is capable of being molded to form articles exhibiting enhanced tensile impact properties, comprising:
   (a) from about 99 to 80% by weight, based on the total weight of the composition, of an oxymethylene polymer with 85% to about 99.9 weight percent based upon the oxymethylene polymer of recurring —OCH$_2$— groups interspersed with groups of the formula:

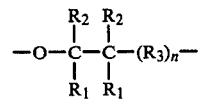

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive, each lower alkyl radical having from 1 to 2 carbon atoms, inclusive, said —OCH$_2$— groups consisting of from 85% to 99.9% of the recurring units and said groups represented by the formula:

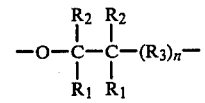

being incorporated during the step of copolymerization to produce said copolymer by the opening up of a ring of a cyclic ether having adjacent carbon atoms or by the breaking of oxygen-to-carbon linkage; said copolymer having an average molecular weight of at least 10,000 and a melting point of at least 150° C.
   (b) from about 1 to about 20% by weight based on the total weight of the composition of a high molecular weight, low crystalline 1,2-polybutadiene comprising at least 90% 1,2-units.

8. The modified polyoxymethylene molding composition of claim 7, wherein said cyclic ether employed during the formation of said oxymethylene copolymer is represented by the formula:

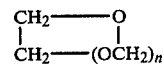

wherein n represents an integer from zero to two.

9. The modified polyoxymethylene molding composition of claim 7, wherein said cyclic ether employed during the formation of said oxymethylene copolymer is ethylene oxide.

10. The modified polyoxymethylene molding composition of claim 7, wherein said 1,2-polybutadiene comprises from about 2% to about 4% by weight according to the total weight of the composition.

11. The modified polyoxymethylene molding composition of claim 7, wherein said 1,2-polybutadiene comprises approximately 3% by weight according to the total weight of the composition.

12. The modified polyoxymethylene molding composition of claim 7, wherein said 1,2-polybutadiene polymer has a number average molecular weight of at least 100,000.

13. The modified polyoxymethylene molding composition of claim 7, wherein said 1,2-polybutadiene polymer has a crystallinity of approximately 10 to 30 percent.

* * * * *